(12) United States Patent
Kennis

(10) Patent No.: US 7,845,007 B1
(45) Date of Patent: *Nov. 30, 2010

(54) METHOD AND SYSTEM FOR INTRUSION DETECTION IN A COMPUTER NETWORK

(75) Inventor: Peter H. Kennis, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/103,447

(22) Filed: Apr. 15, 2008

Related U.S. Application Data

(63) Continuation of application No. 09/561,588, filed on Apr. 28, 2000, now Pat. No. 7,574,740.

(51) Int. Cl.
*G08B 23/00* (2006.01)
*G06F 17/00* (2006.01)
*H04L 29/06* (2006.01)
*H04L 9/32* (2006.01)

(52) U.S. Cl. .............. 726/23; 726/11; 726/13; 726/22; 726/25; 713/151; 713/168; 709/224

(58) Field of Classification Search .......... 726/23, 726/11, 13, 22, 25; 713/151, 168; 709/224
See application file for complete search history.

(56) References Cited

U.S. PATENT DOCUMENTS

| | | | |
|---|---|---|---|
| 5,991,881 A | 11/1999 | Conklin et al. | |
| 6,226,372 B1 | 5/2001 | Beebe et al. | |
| 6,298,445 B1 * | 10/2001 | Shostack et al. | 726/25 |
| 6,353,385 B1 | 3/2002 | Molini et al. | |
| 6,408,391 B1 | 6/2002 | Huff et al. | |
| 6,499,107 B1 | 12/2002 | Gleichauf et al. | |

(Continued)

FOREIGN PATENT DOCUMENTS

WO  WO 00/25527 A2  5/2000

(Continued)

OTHER PUBLICATIONS

Internet Security Systems, SAFEsuite Enterprise, SAFEsuite Decisions, 1998. (Pertinent pp. 47-51, ch. 4, sect. C).

(Continued)

*Primary Examiner*—Aravind K Moorthy
(74) *Attorney, Agent, or Firm*—King & Spalding LLP

(57) ABSTRACT

An intrusion detection system detects intrusion events in a computer network and assesses the vulnerability of the network components to the detected events. The intrusion detection system includes a scanner, one or more sensors and a security console for operation within a networked computing environment. A sensor of the intrusion detection system monitors the networked computing environment for possible intrusion events representing an unauthorized access or use of the network resources. In response to detecting an intrusion event, the sensor generates a scan request for handling by a scanner. This request initiates a scan of the target computer by the scanner to determine the vulnerability of the target to the attack. Based on this vulnerability analysis, the intrusion detection system evaluates the severity of the detected intrusion event and issues an alert having a priority corresponding to the severity of the intrusion.

20 Claims, 8 Drawing Sheets

U.S. PATENT DOCUMENTS

| | | | |
|---|---|---|---|
| 6,574,737 | B1* | 6/2003 | Kingsford et al. ............ 726/25 |
| 6,578,147 | B1 | 6/2003 | Shanklin et al. |
| 6,681,331 | B1 | 1/2004 | Munson et al. |
| 6,711,127 | B1 | 3/2004 | Gorman et al. |
| 6,725,377 | B1 | 4/2004 | Kouznetsov |
| 6,886,102 | B1 | 4/2005 | Shanklin et al. |
| 6,954,775 | B1 | 10/2005 | Shanklin et al. |
| 6,990,591 | B1 | 1/2006 | Pearson |
| 7,096,502 | B1* | 8/2006 | Fox et al. ...................... 726/25 |
| 2005/0252570 | A1 | 11/2005 | Heasman et al. |
| 2006/0272019 | A1 | 11/2006 | Addepalli |
| 2007/0113283 | A1 | 5/2007 | Hrabik et al. |
| 2007/0150574 | A1 | 6/2007 | Mallal et al. |
| 2007/0180526 | A1 | 8/2007 | Copeland, III |
| 2007/0234425 | A1* | 10/2007 | Kim et al. ..................... 726/23 |
| 2007/0294768 | A1 | 12/2007 | Maskovitch et al. |
| 2008/0168560 | A1* | 7/2008 | Durie et al. ................... 726/23 |
| 2008/0306715 | A1* | 12/2008 | Tsai et al. ...................... 703/2 |
| 2009/0106842 | A1* | 4/2009 | Durie ........................... 726/25 |
| 2009/0138970 | A1* | 5/2009 | Tombini et al. ............... 726/23 |
| 2009/0178139 | A1* | 7/2009 | Stute et al. .................... 726/22 |
| 2010/0164721 | A1* | 7/2010 | Pantus ........................ 340/552 |

FOREIGN PATENT DOCUMENTS

| | | |
|---|---|---|
| WO | WO 00/34867 A1 | 6/2000 |
| WO | WO 00/54458 A1 | 9/2000 |
| WO | WO 2005114354 A1 | 12/2005 |

OTHER PUBLICATIONS

Crosbie et al., Active Defense of a Computer System Using Autonomous Agents, Technical Report No. 95-008, Feb. 15, 1995, Purdue University, West Lafayette, Indiana, pp. 1-14. (Pertinent pp. 8-11, sects. 6-7).

Denning, An Intrusion-Detection Model, Feb. 1987, IEEE Transactions on Software Engineering, vol. SE-13, No. 2, pp. 1-17. (Pertinent pp. 1-2, sects. I-II).

Porras et al., Penetration State Transition Analysis A Rule-Based Intrusion Detection Approach, 1992, pp. 220-229. (Pertinent pp. 221-226, sects. 2-4).

Lindqvist et al., eXpert-BSM: A Host-based Intrusion Detection Solution for Sun Solaris, SRI International, Menlo Park, California, Dec. 10-14, 2001, Proceedings of the 17$^{th}$ Annual Computer Security Applications Conference, pp. 1-12. (Pertinent pp. 7-9, sects. 4.3-4.4).

Debar et al., Research Report: A Revised Taxonomy for Intrusion-Detection Systems, Oct. 25, 1999, IBM Research, Switzerland, pp. 1-23. (Pertinent pp. 4-8, sects. 4-5).

NetworkICE Corporation, ICEcap Administrator's Guide, Version 1.0 BETA, 1999, pp. 1-142. (Pertinent pp. 15-24, sect. 3).

Cisco Systems, Inc., NetRanger User's Guide Version 2.1.1, 1998. (Pertinent pp. 1-19, ch. 1).

Porras et al., A Mission-Impact Based Approach to INFOSEC Alarm Correlation, SRI International, Menlo Park, California, Oct. 2002, pp. 1-33. (Pertinent pp. 2-15, sects. 2-4).

Bace, An Introduction to Intrusion Detection and Assessment for System and Network Security Management, 1999, pp. 1-38. (Pertinent pp. 11-16).

Hunteman, Automated Information System—(AIS) Alarm System, University of California, Los Alamos National Laboratory, 20$^{th}$ National Information System Security Conference, Oct. 1997, pp. 1-12. (Pertinent pp. 4-10, sects. 3-6).

Luckham et al., Complex Event Processing in Distributed Systems, Aug. 18, 1988, Stanford University, pp. 1-26. (Pertinent pp. 4-8, sect. 2).

Cuppens, Cooperative Intrusion Detection, pp. 1-10. (Pertinent pp. 2-9, sects. 2-7).

Mukherjee et al., Network Intrusion Detection, IEEE Network, May/Jun. 1994, pp. 26-41. (Pertinent pp. 33-39).

Kumar et al., An Application of Pattern Matching in Intrusion Detection, Technical Report No. CSD-TR-94-013, Jun. 17, 1994, Purdue University, pp. 1-55. (Pertinent pp. 15-26, sect. 4).

Jou et al., Architecture Design of a Scalable Intrusion Detection System for the Emerging Network Infrastructure, Technical Report CDRL A005, Apr. 1997, MCNC, pp. 1-42. (Pertinent pp. 24-28, sect 4.1.3.2).

"Real Secure™, Network Sensor User Guide," Version 5.0, © 2000 by Internet Security Systems, Inc., pp. 1-42. (Pertinent pp. 5-31, chs. 2-3).

Anita D'Amico, Ph.D., "Assessment of Open e-Security Platform™: Vendor-Independent Central Management of Computer Security Resources," Applied Visions, Inc., 1999. (Pertinent pp. 6-10).

Herringshaw, C., Detecting Attacks on Networks, 1997, IEEE, pp. 16-17.

Janakiraman et al., Indra: A peer-to-peer approach to network intrusion detection and prevention, 2003, IEEE, pp. 226-231.

Deswarte et al., Internet Security: An Intrusion-Tolerance Approach, 2006, IEEE, pp. 432-441.

\* cited by examiner

| INTRUSION EVENT IDENTIFIER | SCANNER VULNERABLITY EXPLOIT(S) | VULNERABILITY ANALYSIS ACTION |
|---|---|---|
| BACKORIFICE | BACKORIFICE | RUN COMMAND LINE SCAN (BACKORIFICE POLICY; TARGET ADDRESS; TARGET PORT) |
| HTTP: IIS$$DATA | DATA BUG | RUN COMMAND LINE SCAN (DATA BY POLICY; TARGET ADDRESS) |

FIG. 6

| OPERATING SYSTEM | SERVICE | EXPLOIT |
| --- | --- | --- |
| WINDOWS | -- | BACKORIFICE<br>BACKORIFICE 2000<br>EVILFTP_BACKDOOR<br>NETBUS<br>NETBUS_PRO<br>SUBSEVEN_SCAN<br>SMB_PASSWORD_OVERFLOW<br>WINDOWS_PWL_ACCESS<br>WINDOWS_REGISTRY_READ |
| -- | FTP | FTP_ARGS<br>FTS_BOUNCE<br>FTP_MKDIR<br>FTP_PRIVILEGEDBOUNCE<br>FTP_PRIVILEGEDPORT<br>FTP_ROOT<br>FTP_SITE_EXEC_DOTDOT<br>FTP_SITE_EXEC_TAS |

FIG. 8

METHOD AND SYSTEM FOR INTRUSION DETECTION IN A COMPUTER NETWORK

CROSS REFERENCE TO RELATED APPLICATION

This application is a continuation of U.S. patent application Ser. No. 09/561,588 filed Apr. 28, 2000, now U.S. Pat. No. 7,574,740 entitled, "Method and System for Intrusion Detection in a Computer Network", the entire contents of which are hereby incorporated by reference.

TECHNICAL FIELD

The present invention is generally directed to the detection of an intrusion event in a computer network. More particularly described, the present invention provides an integration of intrusion detection and vulnerability assessment functions for determining the priority of an alert in response to detection of an intrusion event in a computer network.

BACKGROUND OF THE INVENTION

In an open network, data messages from one computer to another computer may be intercepted and data obtained from that message as it is passed to another computer. The most popular open network is the global Internet, where literally millions of servers and computers are coupled through a Transport Control Protocol/Internet Protocol (TCP/IP) communication protocol. While the open network architecture of the Internet permits a user on a network to have access to information on many different computers, it also provides access to messages generated by a user's computer, and to resources of the user's computer. Persons typically called "hackers" exploit the open architecture of the Internet to gain access to computers without authorization. Hackers represent a significant security risk to any computer coupled to a network because a user for one computer may attempt to gain unauthorized access to resources on another networked computer. Hackers also can exploit a computer network by attempting to deny service by a target computer, thereby rendering the computer incapable of a providing normal service.

In an effort to control access to a computer network and, hence, limit unauthorized access to network resources, the computing community has developed computer security devices, intrusion detection techniques, and vulnerability assessment analyses. For example, a firewall can be used to control the transfer of data into or out of a network. An intrusion detection system can be used to provide an alert in the event that the firewall is breached (or an attempt is made to breach the firewall) by an unauthorized user of the computer network. Scanning devices can be used to evaluate the vulnerability of a computer network to a variety of intrusion events.

A typical intrusion detection process is illustrated in the logical flowchart diagram of FIG. 1. Turning now to FIG. 1, the initial task completed by a representative prior intrusion detection process 100 is monitoring of traffic earned by a computer network to detect the possible presence of a known attack signature, as shown in step 110. An intrusion event is detected in step 120 based upon the detection of network data associated with a known attack signature. In step 130, the detected intrusion of the computer network is reported in the form of an alert supplied to the user. Typically, an intrusion alert is supplied to a monitoring console, which is operated by a skilled computer security technician. In response to the intrusion alert, the computer security technician completes in step 140 a manual investigation of the alert.

For example, based upon initial investigation results, the computer security technician may alert a computer emergency response team to respond to a possible attack on the computer network. In the alternative, the computer security technician may determine that the intrusion alert represents a false attack or a false positive event. The detected intrusion represents a false alarm if the intrusion cannot harm the operation of the computer system. The technician typically classifies a detected intrusion as a false positive event if that intrusion presents valid data carried by the computer network.

A typical intrusion detection system generates an alert in response to each detection of a possible intrusion in a computer network. In today's computing environment, a conventional intrusion detection system can generate multiple alerts each day for certain computing environments, such as a popular commercial web site or a "secure" network operated by a governmental agency, military entity or commercial enterprise. Each alert must be manually investigated by a skilled security technician to determine whether the alert represents an actual harmful attack on the computer network. In the absence of a vulnerability assessment of the target, a skilled security staff must complete a labor intensive review of one or more detected intrusion events to determine whether the alert represents an actual attack, a false alarm or a false positive event. Security staff may be hard pressed to complete a timely response to a scenario involving multiple intrusion alerts over a short time period in view of the manual nature of the investigation task. The assessment of computer network vulnerability in response to an intrusion alert is often further complicated by a lack of complete archival records that describe prior trends in detected intrusions of the computer network. Consequently, there is a need for an intrusion detection system that can determine the severity of an intrusion and to classify and record the alert in a real time or near real time operating environment.

Computer network environments are subject to constant changes of both hardware and software components. For example, new network components can be installed or existing components can be removed in a typical corporate network environment. Likewise, new computing services can be installed or removed from the computing environment and upgrades to the computing environment can add one or more new applications. System, network, and security administrators are often challenged to keep-up with the speed at which changes arise in the conventional computer network. Changes in the computer network, however, can affect intrusion detection policies maintained by the computer security team because an assessment of the vulnerability of a computer network to an attack is dependent upon up-to-date knowledge of the current network configuration. A rapidly changing computer network can force the security team completing a manual investigation of an intrusion alert to rely upon out-of-date configuration information about the attack's target. Consequently, there is a need to efficiently create and maintain an up-to-date intrusion detection policy based upon up-to-date knowledge of the present configuration of a computer network.

In view of the foregoing, there is a need for an intrusion detection system that can adequately discern the severity of an intrusion event in a computer network. Moreover, there is a need for an intrusion detection system that can maintain a intrusion detection policy that is consistent with the current configuration of computer network components and services. The present invention solves these problems over the prior art by combining intrusion detection with vulnerability assessment functions to assist evaluation of the vulnerability of a computing network to a detected intrusion.

SUMMARY OF THE INVENTION

The present invention is directed to an improved intrusion detection system for detecting intrusion events in a computer network and assessing the vulnerability of the network components to the detected events. The intrusion detection system comprises a scanner, one or more sensors and a security console for operation within a networked computing environment. A sensor of the inventive intrusion detection system can monitor the networked computing environment for possible intrusion events representing an unauthorized access or use of the network resources. In response to detecting an intrusion event, the sensor can generate a scan request for handling by a scanner. This request initiates a scan of the target computer by the scanner to determine the vulnerability of the target to the attack. Based on this vulnerability analysis, the inventive intrusion detection system can evaluate the severity of the detected intrusion event and issue an alert having a priority corresponding to the severity of the intrusion.

The inventive intrusion detection system also can use the seamier to complete scans of the components of the computer network to characterize the present resource configuration of the networked computing environment. Based upon the results of a sweep, an updated intrusion policy can be created and maintained for use by one or more sensors of the intrusion detection system. The present invention can exchange and correlate information between intrusion detection and vulnerability assessment functions for a combination of a scanner and sensors.

Generally described, the present invention can generate an advisory about an intrusion event in a computer network. A sensor typically monitors traffic in the form of data packets carried by the computer network for a possible intrusion event. In response to detecting an intrusion event, the sensor determines whether the intrusion event represents a qualified intrusion event having a known characteristic associated with a recognized attack and a detectable target vulnerability. If so, the sensor issues to a scanner a request to complete a scan of the computer network. For a network target, the scanner completes a scan operation to evaluating whether the network target is vulnerable to the detected intrusion event. If the target is vulnerable to that event, then the scanner (or the sensor) can transmit an advisory to a security console. This advisory is assigned a ranking based on the vulnerability of the network target. This advisory is presented by the security console to a security technician to prompt an action appropriate with the ranking assigned to the advisory. For example, a high priority alert typically requires immediate attention and represents an actual attack on a target computer that is vulnerable to that attack. In contrast, an alert assigned a low priority indicates a less urgent response, such as logging the alert for archival purposes or future review.

For another aspect of the invention, a network security system comprises one or more sensors, a scanner, and a security console. Each sensor, coupled to the computer network, monitors data packets carried by the computer network for a possible intrusion event A sensor can transmit to the scanner a scan request in response to determining that a detected intrusion event represents a qualified intrusion event having a known characteristic associated with a recognized attack and a detectable target vulnerability. The scanner, which is coupled to the computer network and the sensor, can respond to the scan request by evaluating whether a network target is vulnerable to the detected intrusion event. The scanner (or the sensor) is further operative to issue an the advisory having a ranking based on the vulnerability of the network target. The security console, which is coupled to the sensor and to the scanner, can presenting the advisory to a security technician. The ranking for the advisory, such a high, medium or low priority, defines the action to be taken in response to presentation of the advisory.

These and other advantages of the present invention will be understood based upon a review of the drawing set, the following detailed description and the attached claims defining the invention.

BRIEF DESCRIPTION OF THE DRAWINGS

FIG. 6 is a table illustrating the mapping of network intrusion events to scanner vulnerability exploits to define an appropriate vulnerability analysis action in accordance with an exemplary embodiment of the present invention.

FIG. 8 is a table illustrating the mapping of computing components, such as operating systems and services, to exploits to define an intrusion detection policy in accordance with an exemplary embodiment of the present invention.

DETAILED DESCRIPTION OF THE EXEMPLARY EMBODIMENTS

Figure 1:
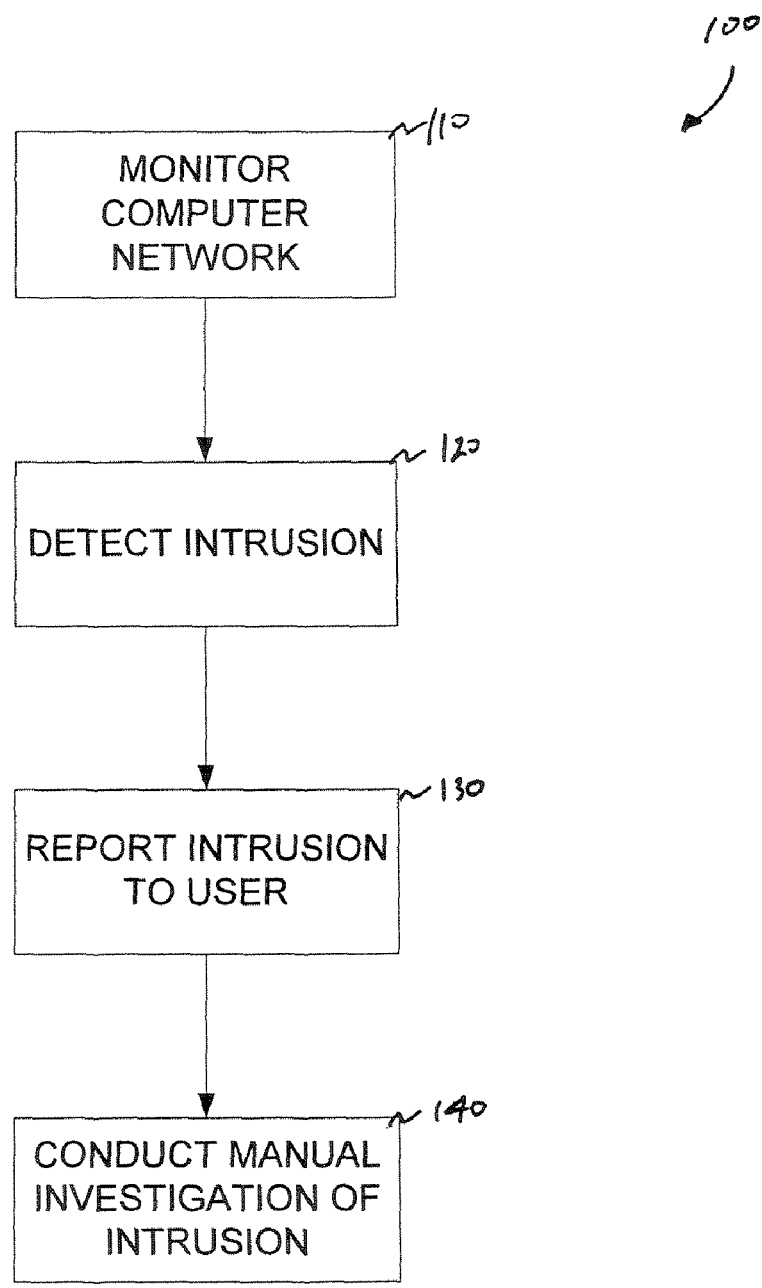
FIG. 1 is a logical flowchart diagram illustrating a prior process for detecting and evaluating an intrusion of a computer network.

A conventional intrusion detection system, while a valuable network security tool, lacks the ability to adequately evaluate the severity of an intrusion event or to maintain an up-to-date intrusion policy consistent with the changing computer network environment. Consequently, there is a need to correlate information about a detected intrusion event to corresponding vulnerability information about the targeted computer component. The present invention solves this problem of prior intrusion detection systems by combining intrusion detection and vulnerability analysis functions to form an integrated or "smart" intrusion detection system.

A sensor of the inventive intrusion detection system can detect an intrusion event and, in response, issue a request for a scan of the attacked system to determine the vulnerability of network components to the attack. Based on this vulnerability analysis, the inventive intrusion detection system can evaluate the severity of the detected intrusion event and issue an alert having a priority corresponding to the severity of the intrusion. Moreover, the inventive detection system can complete scans of the components of the computer network to characterize the present network environment. Based upon the results of a sweep, an updated intrusion policy can be created and maintained for use by one or more sensors of the intrusion detection system. In this manner, the present invention can exchange and correlate information between intrusion detection and vulnerability assessment functions.

Turning now to the drawings, in which like numerals represent like elements, FIGS. 2-8 illustrate the architecture and processes for exemplary embodiments of the present invention. As shown in the exemplary operating environment in FIG. 2, a computer network includes an intrusion detection system 200 and a communications link extending between the Internet 205 and an Intranet 210. The Internet 205 and the Intranet 210 represent examples of distributed computer networks characterized by an open network architecture. A firewall 215 separates the external computing environment, represented by the Internet 205, from the internal computing environment associated with the Intranet 210. To supplement the security feature of the firewall 215, the intrusion detection system 200, comprising a scanner 220, one or more network sensors 225, and a security console 230, operates within the internal computing environment associated with the Intranet 210. One or more computer components, typically servers 235 comprising Web or electronic mail servers, are also connected to the Intranet 210 and operate behind the firewall 215.

Figure 2:
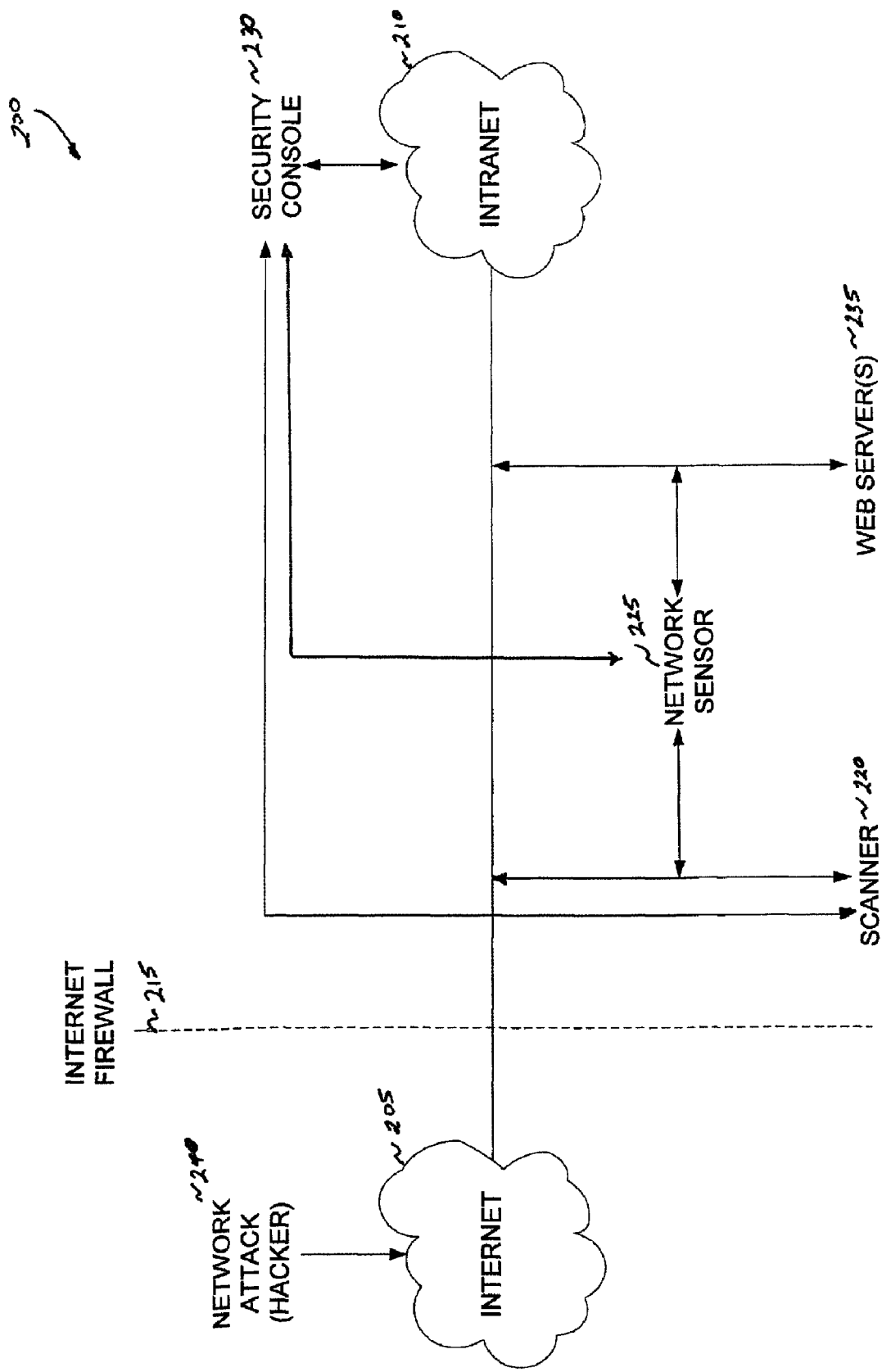
FIG. 2 is a block diagram illustrating the operating environment for an exemplary embodiment of the present invention.

The scanner 220, which is coupled to the network sensors 225 and to the security console 230, can scan the internal computing environment operating behind the firewall 215 to evaluate the vulnerability of computer network components to one or more intrusion events. The sensor 225 is coupled to the servers 235 to monitor network traffic for intrusion events that may affect the proper operation of the servers. In response to detection of an intrusion event, the sensor 225 will initiate an evaluation of the severity of the event. Although the illustration shown in FIG. 2 represents a single network sensor 225, it will be understood that multiple sensors can be used to monitor intrusion events associated with traffic carried by the Intranet 210. In particular, the sensor 225 will request that the scanner 220 complete a scan of one or more computing components or services that are subjected to the intrusion event. This scan operation supports an assessment of the vulnerability of such computing components and services to the intrusion event. Based upon the vulnerability assessment completed by the scanner 220, an alarm can be issued to the security console 230. This alarm can include a priority ranking upon the severity of the detected intrusion event. For example, an alarm can be assigned a high, medium, or low priority as a result of a corresponding vulnerability assessment.

Both the firewall 215 and the inventive intrusion detection system operate in tandem to support the computer network security operations in view of a potential network attack by an unauthorized user 240, such as a hacker, via the Internet 205. For example, a BackOrifice attack can be launched by a hacker 240 against a server 235 running an operating system, such as the WINDOWS operating system offered by MICROSOFT CORPORATION. In response to detection of this intrusion event by the network sensor 225, the scanner 220 completes a scan of the target server. This scan supports an assessment of the vulnerability of the target server to the BackOrifice attack. If the assessment returns a vulnerability of the target to the BackOrifice attack, then a determination is made that the BackOrifice attack is likely to succeed against the target, namely a server operating the operating system. For this scenario, the scanner 220 issues an alert having a high priority to the security console 230. In turn, the operator at the security console 230 can respond to the high priority alert by configuring the firewall 215 to block all traffic from the Internet Protocol (IP) address of the hacker's machine 240. On the other hand, if the assessment does not find that the target is vulnerable to the BackOrifice attack, a lower priority alert is issued by the scanner 220 to the security console 230.

The scanner 220 also can conduct scan operations to identify the components and services associated with the Intranet 210. In the event that the scanner 220 determines a change in the operating environment of the Intranet 210, the scanner supports an update of the intrusion detection policy to reflect the current configuration of components and services for the internal computing environment. This new intrusion detection policy can be applied to each sensor 225. The scan operation conducted by the scanner 220 can be conducted on a continuous basis or predetermined or random schedules. In this manner, the exemplary intrusion detection system 200 can complete a sweep of the protected computing segment and can create a customer policy for intrusion detection based on the sweep results.

The exemplary intrusion detection system 200 illustrated in FIG. 2 provides a significant advantage over the prior art by effectively reducing the total cost of ownership for a secure computing environment. For example, the exemplary intrusion detection system can reduce the amount of time spent by a console operator or a security team to investigate detected intrusion events because only those events assigned high priority may require a responsive action. For example, low and medium priority alerts may be tracked or otherwise documented in an archival log without requiring substantial investigative activity by the console operator. This reduces the amount of operator activity necessary for managing a security system for a computer network. In this manner, the intrusion detection system can filter a flood of alerts arising from the detection of multiple intrusion events by presenting the most critical alert information to the security operator in a quickly recognizable format. For example, the intrusion detection system can assign high priority to an alert for a detected intrusion event only if a vulnerability exists in the target machine.

Figure 3:
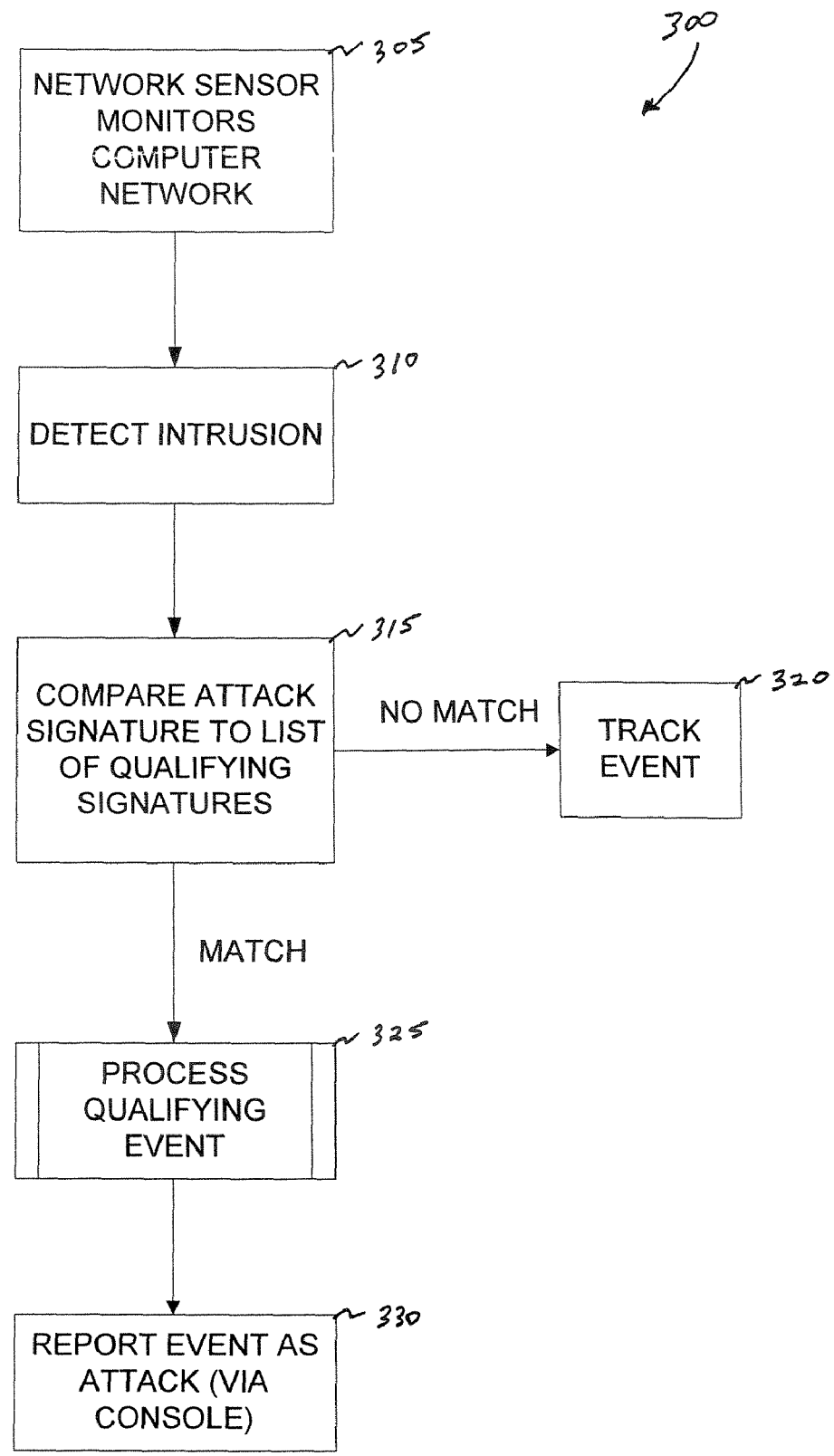
FIG. 3 is a logical flowchart diagram illustrating a process for detecting an intrusion of a computer network in accordance with an exemplary embodiment of the present invention.

FIG. 3 is a logical flowchart diagram illustrating an exemplary process for intrusion detection in a computing environment comprising one or more sensors and a scanner. The exemplary intrusion detection process 300 is initiated in step 305 by using one or more sensors to monitor traffic carried by a conventional computer network having components and services. In step 310, an intrusion event is detected by a network sensor.

The network sensor conducts a comparison operation in step 315 by comparing the attack signature to a list of qualifying signatures. The qualifying signatures represent intrusion events having known characteristics associated with a recognized attack and a detectable target vulnerability. If this comparison task does not result in a match in step 315, a response to the intrusion event is defined by a predetermined configuration for the intrusion detection system. For example, the detected intrusion event can be tracked by creating a corresponding log entry for future reference. If, on the other hand, the attack signature matches a qualifying signature, the detected intrusion event is processed as a qualifying event in step 325.

The processing task completed in step 325 will result in the assignment of a priority ranking to an alert that will be generated in response to the detected intrusion event. For example, the alert can be assigned a high, medium, or low priority. This priority ranking is generated in response to a vulnerability assessment of the target computer that is the subject of the detected intrusion event. In turn, the detected intrusion event is reported as an attack via the console. The operator at the console can respond to the attack by taking one or more actions commensurate with the priority assigned to the attack alert.

Figure 4:
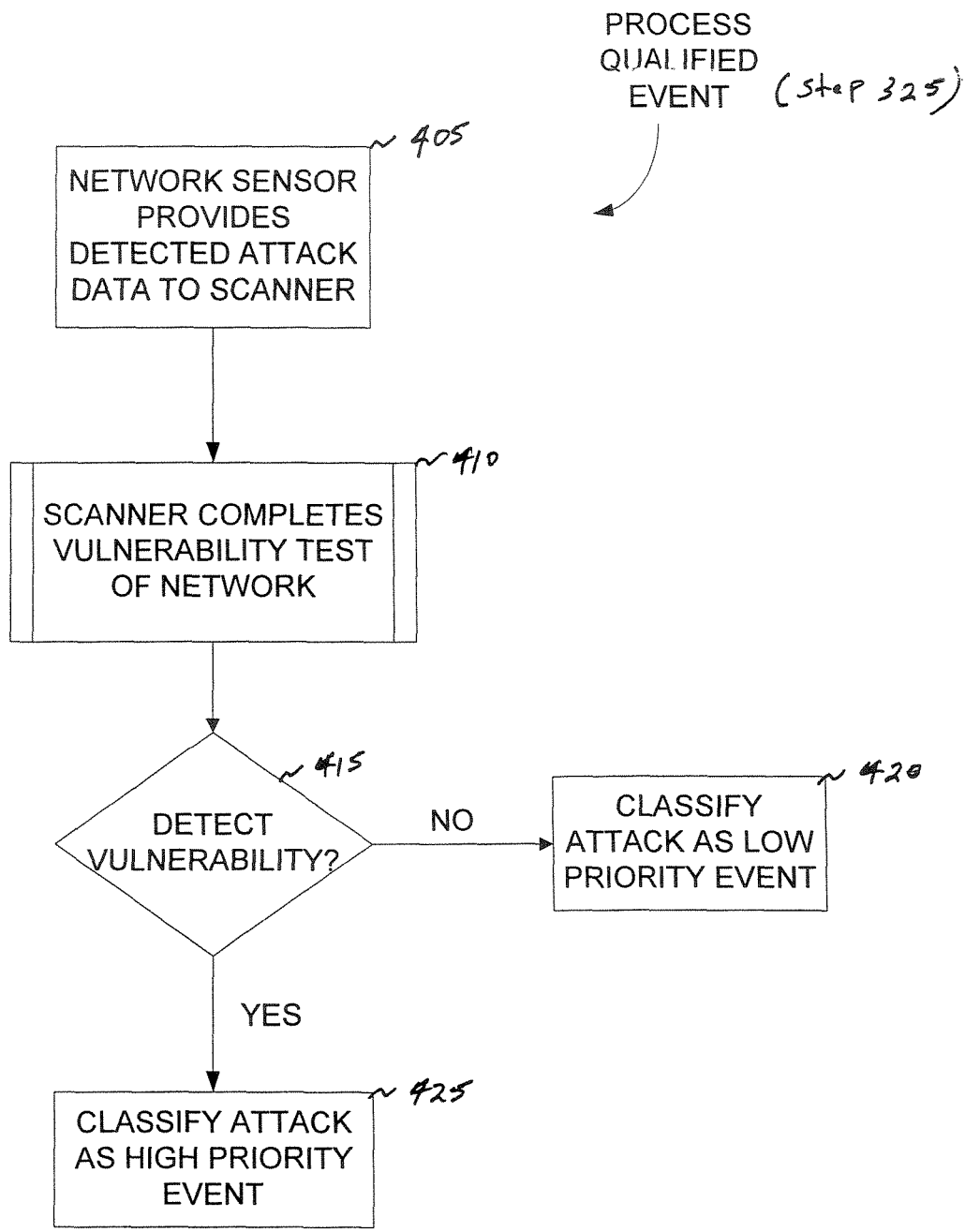
FIG. 4 is a logical flowchart diagram illustrating a process for evaluating a qualified security event associated with a detected intrusion in accordance with an exemplary embodiment of the present invention.

FIG. 4 is a logical flowchart diagram illustrating an exemplary process for processing the qualifying intrusion event based upon the match of an attack signature with qualifying signatures maintained by the network sensor. This exemplary process, which is shown in step 325 of FIG. 3, is further described in the logical flowchart diagram of FIG. 4. Turning now to FIG. 4, a network sensor in step 405 provides to a scanner attack data resulting from the detected intrusion event. In response to the attack data, the scanner completes a vulnerability test of the computer network in step 410. Because the attack data can provide an indication of the computer components or services that represent the subject of an attack, the scanner may focus the vulnerability test on such identified network items. The scanner typically completes the vulnerability test by "replaying" the attack based upon a scan of network components. This enables the scanner to determine whether the detected attack was successful based upon an assessment of vulnerability of the network items to such an attack.

Typical attack data associated with a detected intrusion event include the address of the source machine, the address of the target machine, the target TCP/IP port, and the intrusion event type, including signature characteristics. Based on this attack data, the scanner can "test" the target computer by replaying the attack against the target's address and TCP/IP port to determine the vulnerability of the target to the attack. In the event that a target's component (or service) is "listening" to that address/port combination, then the scanner will determine that a high probability exists that the attack on that network item was successful. In the alternative, a "test" can be completed by using means other than an actual attack completion to evaluate the vulnerability of the target to the attack. For example, it would be undesirable to test a target's vulnerability of a Denial of Service attack by actually completing a Denial of Service-type test against the target.

In decision step 415, an inquiry is conducted to determine whether each network item is vulnerable to an attack based upon the results of the vulnerability test completed in step 410. If the response to this inquiry is negative, the "NO" branch is followed to step 420. The scanner classifies the attack as a low priority (or medium priority) event in step 420. If a vulnerability is detected in step 415, the "YES" branch is followed to step 425. In step 425, the scanner classifies the attack as a high priority event.

Figure 5:
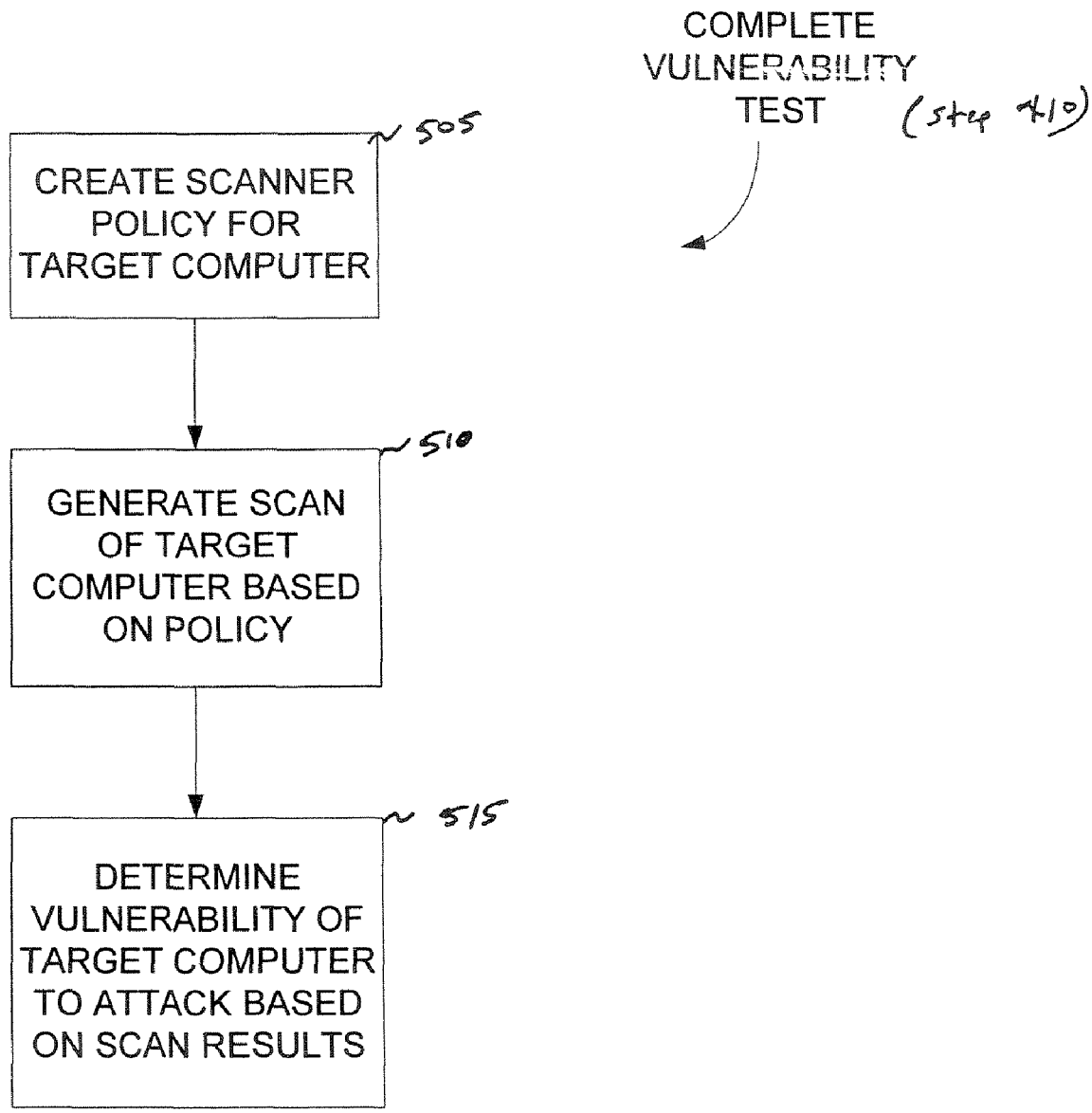
FIG. 5 is a logical flowchart diagram illustrating a process for evaluating the vulnerability of the target computer to a detected intrusion in accordance with an exemplary embodiment of the present invention.

FIG. 5 is a logical flowchart diagram illustrating an exemplary process for completing a vulnerability test. FIG. 5 provides a detailed illustration of the task completed by step 410 of FIG. 4 to complete the vulnerability test of a computer network. Turning now to FIG. 5, a scanner policy for a target computer is created in step 505. The scanner policy defines the vulnerability to be tested, the target address, and the target TCP/IP port.

In step 510, the scanner generates a scan of the target computer based upon the scan policy. For example the scanner, such as the "INTERNET SCANNER" product marketed by INTERNET SECURITY SYSTEMS ("ISS") of Atlanta, Ga., issues the scan by running a "command line" scan against the target computer.

In step 515, the scanner determines the vulnerability of the target computer to the attack based upon the scan results. A representative system for detecting and identifying security vulnerabilities in an open network computer system is described in U.S. Pat. No. 5,892,903. The '903, which is assigned to the assignee for the present application, is fully incorporated herein by reference.

For a representative example involving the scanner, a sensor detects a BackOrifice attack and issues a request that the scanner complete a corresponding scan of the target computer. A new scanner policy for the scanner can be created based on the characteristics "blank" and "BackOrifice." The scan is completed by running a command-line scan having the values "newly created policy," "target address" and "target port." The output or results of the scan are analyzed to determine whether the target computer is vulnerable to the BackOrifice attack. In other words, at the completion of a BackOrifice-type scan, the scanner has information describing the vulnerability of the target computer to the BackOrifice attack. This enables the scanner (or the sensor) to assign a priority rating to an alert based on the corresponding vulnerability assessment for the target computer. For example, if the target computer is vulnerable to the BackOrifice attack, then a high priority alert is transmitted to the security console from either the scanner or the sensor. If, on the other hand, the target computer is not vulnerable to the BackOrifice attack, then the scanner or the sensor issues a medium priority alert. The high priority alert provides an indication for the need to take immediate action to address the attack, while the medium priority alert suggests a less urgent response, such as logging the alert for future consideration.

For another representative example involving ISS's INTERNET SCANNER device, a sensor detects an HTTP: IIS$DATA attack and issues a request that the scanner complete a corresponding scan of the target computer. A new scanner policy for the INTERNET SCANNER device can be created based on the characteristics "blank" and "DATA bug." The scan is completed by running a command-line scan having the values "newly created policy" and "target address." The output of the scan are analyzed to determine whether the target computer is vulnerable to the HTTP:IIS$DATA attack. In turn, the scanner (or the sensor) assigns a priority rating to an alert based on the corresponding vulnerability assessment for the target computer. If the target computer is vulnerable to the HTTP:IIS$DATA attack, then a high priority alert is transmitted to the security console. If the target computer is not vulnerable, then the scanner or sensor issues a low priority alert for receipt by the security console. In contrast to an alert assigned a high priority, an alert assigned a low priority indicates a less urgent response, such as logging the alert for archival purposes or future review.

For yet another representative example involving ISS's INTERNET SCANNER device, a sensor detects a "Smurf" attack and issues a request that the scanner complete a corresponding scan of the target computer. In response, the scanner transmits a single ping packet to the target computer. If the target computer responds to the ping by issuing a ping reply, then the scanner (or the sensor) can issue to the security console an alert assigned a low priority. If, on the other hand, the ping of the target computer does not result in a ping reply, then another ping packet is transmitted to the target computer. If the target computer now responds to the ping packet by issuing a reply, then the scanner (or the sensor) issues an alert having a low priority. In the absence of receiving a reply to the extra ping packet, an alert is issued having a high priority. A high priority alert typically requires immediate attention and represents an actual attack on a target computer that is vulnerable to that attack. In contrast, an alert assigned a low priority indicates a less urgent response, such as logging the alert for archival purposes or future review.

Table I provides a listing of qualified attack signatures by category and vulnerability assessment method and assigns the priority to the responding advisory or alert.

TABLE I

| Signature family | Vulnerability assessment method | High alert | Medium alert | Low alert |
| --- | --- | --- | --- | --- |
| Backdoors | Verify if the target: port combination is listening | Target: port is listening | Not listening | Never |
| Denial of Service | For most DoS attacks, verify if host responds to a single ping. In case ICMP is not allowed, use portscan | Target is not responding to ping or portscan | Never | Host is responding |
| All trin00 and tfn alerts. | Scan target to determine if there are DDoS listeners | DDoS listeners detected | DDoS listeners not detected | Never |
| DNS | For hostname overflow attack, probe target using S2 and/or RS agent, determine access breach from source | Access breached | Never | No breach |
| Email | Overflow attacks: see DNS approach, Others (in general) verify version of sendmail on target | Access breached, others: if old sendmail detected | Never | All other cases |
| Finger | Verify 'finger' daemon active | Fingerd found | Never | No daemon found |
| FTP | For some decodes: verify ftp daemon version (e.g. wu-ftpd 2.4.1 | Some cases where old daemon is detected | Never | All other cases |
| HTTP | Most cases: replay URL. And parse findings. | Suspicious findings after parsing data | Some cases, | All other cases |
| ICMP | Loki: search for daemon. Pingflood& ping of death: check if target is alive | Loki daemon found or host down | Loki, no daemon | All other cases |
| Ident | Check for SendMail version 8.6.9 | 8.6.9 found | Never | Not found |
| IMAP | Check for IMAP older than 4.1 beta | <=4.1. beta | Never | All other cases |
| IP | Certain signatures (sourceroute) verify host breach using S2 or System Agent | Security breached | Not breached | Never (for Sourceroute) signature. |
| IRC | IRC daemon overflow, verify version | Old version detected | Never | All other cases |
| Netbios | No automation wanted | | | |
| Nfs | Depending on decode, verify nfs version | Depending on decode, if old version found | Never | All other cases |
| NNTP | Verify server version | Old exchange or INN | Never | All other cases |
| POP | Determine pop version (overflow attacks) | Old version | Never | All other cases |
| RIP | No action required | Never | Never | Always |
| Scanners | No action required | Always | Never | Never |
| SNMP | Snmp_delete_wins: S2 verify integrity of wins database Snmp backdoors: verify snmp version | S2 detected corrupt wins DB or old snmp server found | Nevers | All other cases |
| SUNRpc | For most signatures, verify host (sun?) and version | Depending on combination of signature detected and old = Y | Nevers | All other cases |
| TFTP | No action required | | | |
| Unix Remote | No action required (it's either allowed or not) | | | |
| Windows | Samba: verify version Winnuke: host alive? | 'old' samba host dead | Never Never | other cases other cases |
| Other | Certain signatures: check version info, others always high (packet capturing) others: verify service (rwho) | Old versions or vulnerable service found or packet capturing detected | never | All others. |

FIG. 6 illustrates a table for mapping the combination of an intrusion event identifier and scanner vulnerability exploit(s) to a vulnerability analysis action. For example, for a BackOrifice event, the BackOrifice exploit is activated and the vulnerability analysis action is defined by "Run Command line Scan (BackOrifice Policy; Target Address; Target Port). For an HTTP:ISS$$DATA event, the DATA bug exploit is activated and vulnerability analysis action is defined by "Run Command line Scan (DATA bug Policy; Target Address). This table can be maintained in a storage medium, such as memory, for access by the intrusion detection system.

The constant change in a typical computing environment can pose a threat to the successful detection of an intrusion event. In the absence of accurate knowledge of the computing environment, an intrusion detection system may not detect an attack on the computer network. For example, if a server running the "LINUX" operating system with all default services is installed on a computer network, this new computer adds a large number of additional services on to the computer network.

Prior intrusion detection systems must be notified of the changes to a computing environment to support effective monitoring of network items for possible intrusion events. If the security administrator is unaware of a computing environment change, the intrusion detection system continues to monitor the computing environment without recognition of the addition or removal of a network item. This can pose a serious threat to the computer network because the intrusion detection system is not able to detect an intrusion event arising from a possible attack against the modified computing environment. An exemplary embodiment of the present invention addresses this problem by using the scanner to monitor the computing environment for the addition or removal of the network item. Based upon the results of a scan operation, a new intrusion detection policy can be created and applied for operation by network sensors. This exemplary method is illustrated in the logical flowchart diagram of FIG. 7.

Figure 7:
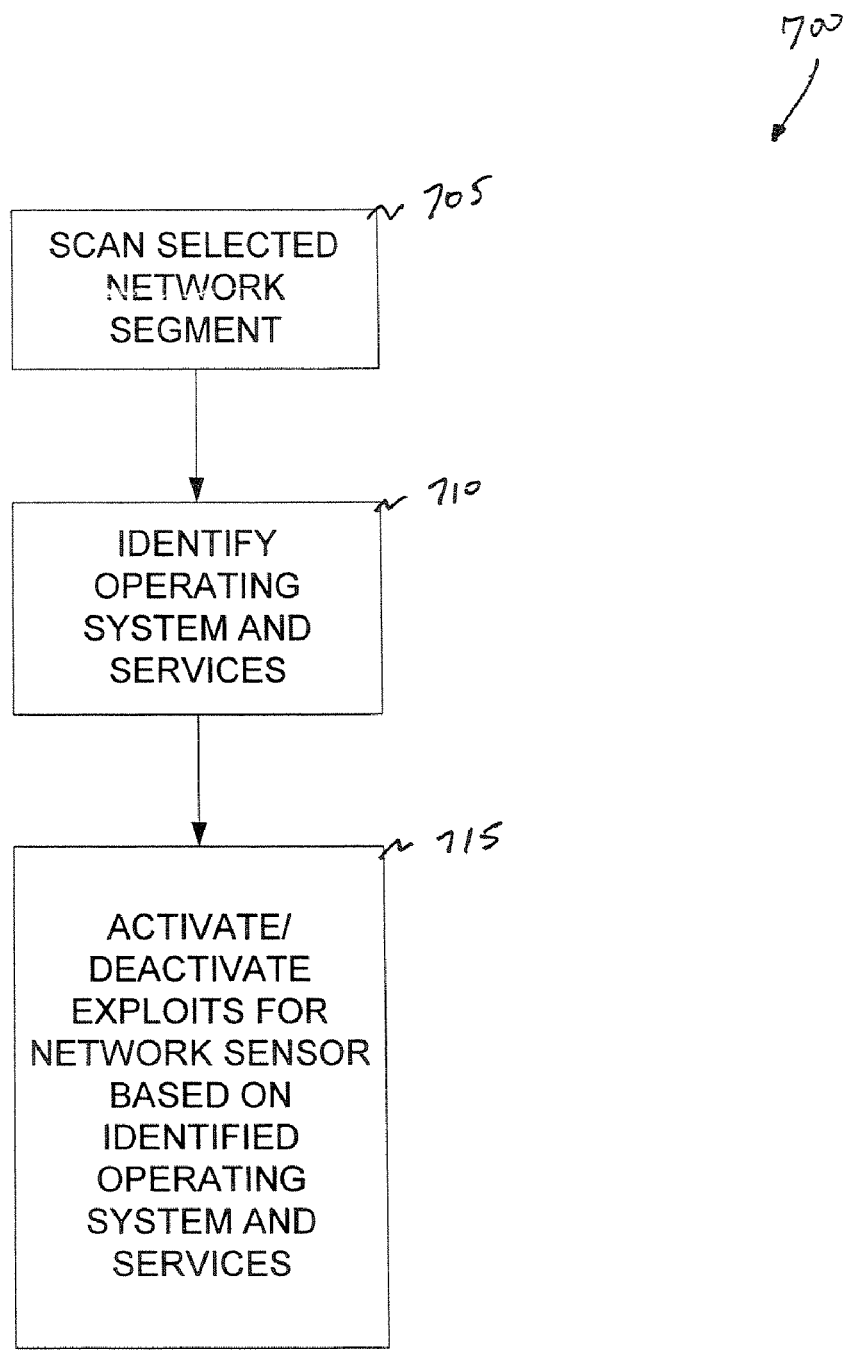
FIG. 7 is a logical flowchart diagram illustrating a process for creating an intrusion detection policy in response to the current configuration of a computing environment in accordance with an exemplary embodiment of the present invention.

Turning now to FIG. 7, an exemplary scanning process 700 is initiated in step 705 by scanning the selected item or segment of the computer network. For example, the scanner can select a particular target computer for the scan operation. The scanner can complete this scanning operation on a continuous basis or at predetermined time periods. In the alternative, the scanner can conduct a scan operation at random times in an effort to detect components or services that have been added or removed from the selected network segment. A sufficient number of scan operations should be completed on a regular basis, however, to insure the detection of change in the computing environment.

In step 710, the scanner can identify the present configuration of network component and services, including operating systems, based upon the scan of the selected network segment. Typical services include port mappers, "finger" daemons, Yellow Pages services and SMB services. Typical operating systems include the "WINDOWS", "UNIX", and "LINUX" operating systems. An exemplary system for scanning computer network and identifying the components and services of the computing environment is described in U.S. Pat. No. 5,892,903, which is fully incorporated herein by reference. For ISS's INTERNET SCANNER device, the scan of the network segment selected for protection is typically completed by running a Command Line Scan.

In step 715, exploits for the network sensor are activated (or deactivated) based upon the present configuration of the computing environment. The scanner generates an output file in response to scanning the selected network segment. For each service or operating system identified in the output file, predetermined exploits or checks are activated (or deactivated). The scanner creates a new policy file in response to this definition of activated exploits and forwards that policy to the network sensor. The security console also can receive this new policy to support its application of the policy to the network sensor.

In this manner, the monitoring operations completed by a network scanner can be updated to match the identified items of the computer network. Monitoring operations conducted by the network sensor are preferably matched to the susceptibility of the current computer network configuration to certain intrusion events. This enables the intrusion detection system to be configured and monitored for the types of intrusion events for which the current computing configuration is vulnerable.

FIG. 8 is a table illustrating a mapping between the combination of typical network items, such as operating systems and services, to vulnerability exploits. This table illustrates the specific known vulnerability exploits for intrusion events representing potential vulnerabilities of the mapped combination of operating systems and services. This table, which supports the creation of an intrusion detection policy, can be applied to a sensor of the intrusion detection system.

What is claimed is:

1. A computer-implemented process for generating an advisory about an intrusion event in a computer network, comprising the steps of:
   a sensor monitoring data packets for a possible intrusion event;
   the sensor detecting an intrusion event;
   the sensor determining whether the detected intrusion event has a known characteristic associated with a recognized attack;
   a scanner identifying a target of the detected intrusion event;
   the scanner evaluating whether the network target is vulnerable to the detected intrusion event;
   the scanner assigning the detected intrusion event with a ranking based on the vulnerability of the network target, wherein the advisory has the assigned ranking associated with a low priority attack event if the evaluation fails to identify a vulnerability of the scanned network target to the detected intrusion event; and
   the scanner issuing the advisory having the assigned ranking.

2. The computer-implemented process of claim 1, further comprising the step of the scanner issuing a command to configure a security policy in response to completing the evaluation of the vulnerability of the network target to the detected intrusion event.

3. The computer-implemented process of claim 1, wherein the advisory defines an action to be taken.

4. The computer-implemented process of claim 1, wherein the advisory has the assigned ranking associated with a high priority attack event if the evaluation identifies a vulnerability of the network target to the detected intrusion event.

5. The computer-implemented process of claim 1, further comprising the step of the scanner issuing a command to configure exploits for a sensor associated with the network target in response to completing an assessment of the vulnerability of the network target to the detected intrusion event, thereby configuring a security policy for the associated sensor without manual intervention.

6. The computer-implemented process of claim 1, further comprising the step of the sensor issuing a scan request to the scanner in response to determining that the detected intrusion event has a known characteristic associated with a recognized attack.

7. The computer-implemented process of claim 1, further comprising the step of the scanner adding information associated with the detected intrusion event to an archival log based on the assigned ranking associated with the low priority attack.

8. The computer-implemented process of claim 1, further comprising the step of the scanner transmitting the advisory to a security console for display, wherein the security console receives a plurality of advisories comprising priority rankings and displays the advisories based on the respective priority rankings.

9. The computer-implemented process of claim 1, wherein the advisory comprises one of actions to be taken in response to the detected intrusion event and an indication of priority corresponding to severity of the detected intrusion event.

10. A computer-implemented process for generating an advisory about an intrusion event in a computer network, comprising the steps of:
   a sensor monitoring data packets carried by the computer network for a possible intrusion event;
   the sensor detecting an intrusion event;
   the sensor determining whether the detected intrusion event has a known characteristic associated with a recognized attack and a detectable target vulnerability;
   a scanner identifying a network target of the detected intrusion event;
   the scanner evaluating whether the network target is vulnerable to the detected intrusion event;
   the scanner assigning the detected intrusion event with a ranking based on the vulnerability of the network target, wherein the advisory has the assigned ranking associated with a high priority attack event if the evaluation identifies a vulnerability of the evaluated network target to the detected intrusion event; and
   the scanner issuing the advisory having the assigned ranking.

11. The computer-implemented process of claim 10, further comprising the step of the scanner issuing a command to configure a security policy for the sensor in response to completing the evaluation of the vulnerability of the network target to the detected intrusion event.

12. The computer-implemented process of claim 10, wherein the advisory defines an action to be taken.

13. The computer-implemented process of claim 10, further comprising the step of the scanner issuing a command to configure exploits for a sensor associated with the evaluated network target in response to completing an assessment of the vulnerability of the evaluated network target to the detected intrusion event, thereby configuring a security policy for the associated sensor without manual intervention.

14. The computer-implemented process of claim 10, further comprising the step of the scanner transmitting the advisory to a security console for display, wherein the security console receives a plurality of advisories comprising priority rankings and displays the advisories based on the respective priority rankings.

15. The computer-implemented process of claim 10, wherein the advisory comprises one of actions to be taken in response to the detected intrusion event and an indication of priority corresponding to severity of the detected intrusion event.

16. The computer-implemented process of claim 10, further comprising the step of the sensor issuing a scan request to the scanner in response to determining that the detected intrusion event has a known characteristic associated with a recognized attack.

17. A computer system for generating an advisory about an intrusion event in a computer network, the computer system comprising:
   a CPU, a computer-readable memory, and a computer-readable storage media;
   first program instructions to monitor data packets for a possible intrusion event;
   second program instructions to detect an intrusion event;
   third program instructions to determine whether the detected intrusion event has a known characteristic associated with a recognized attack;
   fourth program instructions to identify a target of the detected intrusion event;
   fifth program instructions to evaluate whether the network target is vulnerable to the detected intrusion event;
   sixth program instructions to assign the detected intrusion event with a ranking based on the vulnerability of the network target, wherein the advisory has the assigned ranking associated with a low priority attack event if the evaluation fails to identify a vulnerability of the scanned network target to the detected intrusion event; and
   seventh program instructions to issue the advisory having the assigned ranking;
   wherein each of the program instructions are stored on the computer-readable storage media for execution by the CPU via the computer-readable memory.

18. The computer system of claim 17, further comprising eighth program instructions to issue a command to configure a security policy in response to completing the evaluation of the vulnerability of the network target to the detected intrusion event.

19. The computer system of claim 17, wherein the advisory defines an action to be taken.

20. The computer system of claim 17, wherein the advisory has the assigned ranking associated with a high priority attack event if the evaluation identifies a vulnerability of the network target to the detected intrusion event.

* * * * *